United States Patent Office 2,874,089
Patented Feb. 17, 1959

2,874,089

STABLE VITAMIN B$_{12}$ SOLUTIONS

Donald A. Zuck, Indianapolis, Ind., assignor to Eli Lilly and Company, Indianapolis, Ind., a corporation of Indiana No Drawing. Application July 5, 1957
Serial No. 669,941

10 Claims. (Cl. 167—81)

This invention relates to the stabilization of aqueous solutions containing vitamin B$_{12}$.

It is well recognized that although vitamin B$_{12}$ is relatively stable in aqueous solution when the solution is contained in sealed vials which are protected from direct sunlight, the vitamin is often quite unstable when it is incorporated in a mixture with other substances. This is especially true when the composition is a medicinal preparation of such a character that its dispensing requires frequent opening of the container in which the preparation is packaged. It is further well recognized that other vitamins, particularly ascorbic acid (vitamin C) can have a destructive effect upon vitamin B$_{12}$. For example, the action of ascorbic acid is such that when the latter vitamin is incorporated with vitamin B$_{12}$, as in a multivitamin preparation, the vitamin B$_{12}$ activity of the preparation constantly and rapidly deteriorates regardless of whether the preparation is contained in a sealed or readily openable container. Hence, it is highly desirable to provide stabilization for vitamin B$_{12}$ in aqueous solutions which solutions contain ingredients destructive to vitamin B$_{12}$ activity, and might be repeatedly exposed to the atmosphere in dispensing.

I have discovered that a solution of vitamin B$_{12}$ is made quite resistant to loss of vitamin B$_{12}$ potency contained therein by incorporating in said solution a water-soluble, nontoxic cationic salt of a group of metallocyanide complexes consisting of the cobalticyanide, molybdocyanide, ferrocyanide and ferricyanide complexes. Because of commercial availability, the potassium salt of the complex is generally employed, but any other non-toxic, water-soluble metallic, ammonium or amine salt, can be used with equally efficacious results since it is not the cationic portion but the metallocyanide complex portion which contributes the stabilizing effect. Illustrative salts include the sodium, calcium, ethanolamine, piperidine and the like salts.

The stabilizing agent is incorporated in the mixture in an amount of about 0.002 to 0.2 percent on a weight/volume basis, reference being had to the volume of the entire preparation as distinguished from the amount of vitamin B$_{12}$ contained therein, and bearing in mind that in pharmaceutical preparations the amount of vitamin B$_{12}$ in the preparation is present in minor amount so that that generally its content does not exceed about 10 mcg. per ml. of liquid preparation.

The concentration of about 0.002 to 0.2 percent of the above-described stabilizers is effective to provide stabilization of the vitamin B$_{12}$ in the multivitamin preparation, but yet is sufficiently low so that there is no observable alteration of the vitamin B$_{12}$ preparation, either in taste, appearance or toxicity. A concentration of about 0.02 percent of the salt in multivitamin preparations yields excellent stabilization to the vitamin B$_{12}$ contained therein, and such concentration, or thereabouts, is preferred.

The effective stabilization of vitamin B$_{12}$ provided with this invention has been demonstrated by experimental aging tests. Such tests were carried out on multivitamin mixtures dispersed in 5 percent aqueous alcohol made up to contain in each milliliter of dispersion about the following amounts of vitamins:

| | |
|---|---:|
| Thiamin chloride_____mg__ | 0.214 |
| Riboflavin-5-phosphate (sodium salt)_____mg__ | 0.266 |
| Ascorbic acid_____mg__ | 12.9 |
| Nicotinamide _____mg__ | 2.2 |
| Pyridoxine hydrochloride_____mg__ | 0.22 |
| Vitamin A (palmitate), U. S. P. units_____ | 699 |
| Vitamin D, U. S. P. units_____ | 220 |
| Vitamin B$_{12}$_____mcg__ | 0.8 |

The above-prepared multivitamin mixture was divided into several aliquots, one aliquot being retained as a control and to other aliquots, the potassium salts of cobalticyanide, molybdocyanide, ferrocyanide, and ferricyanide were added in a concentration of 0.02 percent on a weight/volume basis. The samples were allowed to remain at 25° C. for six months after which time the aliquots were reassayed for B$_{12}$ activity. The assays showed that the vitamin B$_{12}$ content in the control aliquot had dropped to only about 20 percent of its original activity, whereas those samples to which the above-listed stabilizers had been added, had retained upwards of about 90 percent of their original vitamin B$_{12}$ activity.

An illustrative example of an aqueous multivitamin composition stabilized in accordance with this invention is as follows:

| | |
|---|---:|
| Synthetic vitamin A palmitate, U. S. P. units_____ | 600 |
| Vitamin D, U. S. P. units_____ | 200 |
| Thiamin chloride_____mg__ | 0.2 |
| Riboflavin-5-phosphate (sodium salt)_____mg__ | 0.24 |
| Pyridoxine hydrochloride_____mg__ | 0.2 |
| Nicotinamide _____mg__ | 2.0 |
| Ascorbic acid_____mg__ | 12.0 |
| Vitamin B$_{12}$_____mcg__ | 0.6 |
| Potassium ferrocyanide, percent (w./v.)_____ | 0.02 |

The above ingredients together with suitable emulsifying and flavoring agents are incorporated in a 5 percent aqueous alcohol solution of sufficient volume to provide the above quantities of ingredients in each milliliter of emulsion. The mixture is thoroughly emulsified and the pH is adjusted to about pH 3.8. The mixture is then suitably bottled for distribution to the trade.

An example of a solution of a multivitamin composition stabilized in accordance with this invention is as follows:

| | |
|---|---:|
| Thiamin chloride_____mg__ | 25 |
| Pyridoxine hydrochloride_____mg__ | 10 |
| Nicotinamide _____mg__ | 100 |
| Riboflavin-5-phosphate (sodium salt)_____mg__ | 6 |
| Sodium pantothenate_____mg__ | 5 |
| Ascorbic acid_____mg__ | 150 |
| Vitamin B$_{12}$_____mcg__ | 10 |
| Potassium cobalticyanide, percent (w./v.)_____ | 0.02 |

The above ingredients are dissolved in sufficient 5 percent aqueous alcohol in amount sufficient to provide the above quantities in each 2 ml. of solution. To the solution are added such flavoring and coloring agents as are desired, and the final solution is filled into suitable dispensing containers.

An example of a solution of a simple multivitamin composition stabilized in accordance with this invention is as follows:

| | |
|---|---:|
| Ascorbic acid_____mg__ | 50 |
| Vitamin B$_{12}$_____mg__ | 10 |
| Potassium molybdocyanide, percent (w./v.)_____ | 0.04 |

The above ingredients are dissolved in sufficient 5 percent aqueous alcohol to provide the above quantities in a milliliter of solution.

In place of the potassium salts employed in the foregoing examples, any of the other salts set forth hereinabove can be used to provide multivitamin solutions which retain substantially all of their vitamin $B_{12}$ activity for long periods of time.

I claim:

1. An aqueous multivitamin preparation comprising vitamin $B_{12}$ and, on a weight/volume basis, from about 0.002 to about 0.2 percent of a compound of the group consisting of the water-soluble, nontoxic, cationic salts of cobalticyanide, molybdocyanide, ferrocyanide and ferricyanide.

2. An aqueous multivitamin preparation comprising vitamin $B_{12}$ and, on a weight/volume basis, about 0.02 percent of a compound of the group consisting of the water-soluble, nontoxic, cationic salts of cobalticyanide, molybdocyanide, ferrocyanide and ferricyanide.

3. An aqueous multivitamin preparation comprising vitamin $B_{12}$ and, on a weight/volume basis, from about 0.002 to about 0.2 percent of potassium cobalticyanide.

4. An aqueous multivitamin preparation comprising vitamin $B_{12}$ and, on a weight/volume basis, about 0.02 percent of potassium cobalticyanide.

5. An aqueous multivitamin preparation comprising vitamin $B_{12}$ and, on a weight/volume basis, from about 0.002 to about 0.2 percent of potassium molybdocyanide.

6. An aqueous multivitamin preparation comprising vitamin $B_{12}$ and, on a weight/volume basis, about 0.02 percent of potassium molybdocyanide.

7. An aqueous multivitamin preparation comprising vitamin $B_{12}$ and, on a weight/volume basis, from about 0.002 to about 0.2 percent of potassium ferrocyanide.

8. An aqueous multivitamin preparation comprising vitamin $B_{12}$ and, on a weight/volume basis, about 0.02 percent of potassium ferrocyanide.

9. An aqueous multivitamin preparation comprising vitamin $B_{12}$ and, on a weight/volume basis, from about 0.002 to about 0.2 percent of potassium ferricyanide.

10. An aqueous multivitamin preparation comprising vitamin $B_{12}$ and, on a weight/volume basis, about 0.02 percent of potassium ferricyanide.

References Cited in the file of this patent

UNITED STATES PATENTS 2,823,167    Newmark _____ Feb. 11, 1958

FOREIGN PATENTS 486,212    Canada _____ Sept. 2, 1952

OTHER REFERENCES

Stapert: J. of the Am. Pharm. Asso., vol. 42, No. 2, February 1954, pp. 87–90.